(12) United States Patent
Inoue et al.

(10) Patent No.: US 11,143,251 B2
(45) Date of Patent: Oct. 12, 2021

(54) DISK BRAKE

(71) Applicant: HITACHI AUTOMOTIVE SYSTEMS, LTD., Ibaraki (JP)

(72) Inventors: Hayuru Inoue, Ayase (JP); Tsuyoshi Chiba, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/478,993

(22) PCT Filed: Jan. 17, 2018

(86) PCT No.: PCT/JP2018/001192
§ 371 (c)(1),
(2) Date: Jul. 18, 2019

(87) PCT Pub. No.: WO2018/139306
PCT Pub. Date: Aug. 2, 2018

(65) Prior Publication Data
US 2019/0353213 A1    Nov. 21, 2019

(30) Foreign Application Priority Data

Jan. 26, 2017 (JP) .............................. JP2017-012231

(51) Int. Cl.
*F16D 55/227* (2006.01)
*F16D 65/00* (2006.01)
(Continued)

(52) U.S. Cl.
CPC ....... *F16D 55/227* (2013.01); *F16D 65/0087* (2013.01); *F16D 65/0068* (2013.01);
(Continued)

(58) Field of Classification Search
CPC .. F16D 65/097; F16D 55/227; F16D 65/0087; F16D 65/0093; F16D 65/0068;
(Continued)

(56) References Cited

U.S. PATENT DOCUMENTS 3,952,840 A * 4/1976 Yamazaki ............... F16D 55/22
188/71.8
4,144,952 A * 3/1979 Nakayama ............ F16D 55/227
188/73.45
(Continued)

FOREIGN PATENT DOCUMENTS

FR    2 905 155 A1    2/2008
JP    6-28366 U       4/1994
(Continued)

OTHER PUBLICATIONS

Translation of Chinese Office Action received in corresponding Chinese Application No. 201880006970.9 dated Mar. 16, 2020.
(Continued)

*Primary Examiner* — Melanie Torres Williams
(74) *Attorney, Agent, or Firm* — Mattingly & Malur, P.C.

(57) ABSTRACT

A disk brake includes an attachment member (11) having a pair of pin support sections (26) in which pin holes (29) extending in a disk axial direction are formed and disposed to cross an outer circumferential side of a disk, and fixed to a non-rotating section of a vehicle, a caliper (13) having slide pins (30) slidably inserted into the pin holes (29) at both sides in a disk circumferential direction and movably supported by the attachment member in the disk axial
(Continued)

direction, and a pair of pads movably supported by the attachment member and pressed against both surfaces of the disk by the caliper, wherein the slide pin includes a pin main body having an annular groove (153) on a tip side, and a tubular elastic deformation member (131) having a plurality of convex sections (162) on an inner circumferential side and provided in the annular groove (153).

4 Claims, 7 Drawing Sheets

(51) Int. Cl.
*F16D 65/18* (2006.01)
*F16D 55/00* (2006.01)
*F16D 121/04* (2012.01)
*F16D 121/14* (2012.01)
*F16D 125/28* (2012.01)
*F16D 125/58* (2012.01)

(52) U.S. Cl.
CPC ...... *F16D 65/183* (2013.01); *F16D 2055/007* (2013.01); *F16D 2055/0016* (2013.01); *F16D 2121/04* (2013.01); *F16D 2121/14* (2013.01); *F16D 2125/28* (2013.01); *F16D 2125/582* (2013.01)

(58) Field of Classification Search
CPC ............. F16D 65/183; F16D 2055/007; F16D 2121/04; F16D 2121/14; F16D 2125/28; F16D 2125/582
See application file for complete search history.

(56) References Cited

U.S. PATENT DOCUMENTS

| | | | | | |
|---|---|---|---|---|---|
| 4,458,790 | A | * | 7/1984 | Hoffman, Jr. | F16D 65/0979 188/196 P |
| 4,537,288 | A | * | 8/1985 | Stoka | F16D 65/54 188/196 P |
| 4,715,479 | A | * | 12/1987 | Buckley | F16D 55/224 188/196 P |
| 5,111,914 | A | * | 5/1992 | Thiel | F16D 55/227 188/73.34 |
| 6,135,245 | A | * | 10/2000 | Kurasako | F16D 55/22655 188/73.45 |
| 8,944,221 | B2 | * | 2/2015 | Pericevic | F16D 55/22655 188/73.44 |
| 2009/0272607 | A1 | * | 11/2009 | Fischer | F16D 55/22655 188/72.6 |
| 2013/0161134 | A1 | * | 6/2013 | Kobayashi | F16J 3/046 188/73.44 |

FOREIGN PATENT DOCUMENTS

| | | |
|---|---|---|
| JP | 2008-89012 A | 4/2008 |
| JP | 2009-196387 A | 9/2009 |
| JP | 2009-274606 A | 11/2009 |

OTHER PUBLICATIONS

International Search Report of PCT/JP2018/001192 dated Mar. 6, 2018.
Written Opinion of PCT/JP2018/001192 dated Mar. 6, 2018.

* cited by examiner

DISK BRAKE

TECHNICAL FIELD

The present invention relates to a disk brake for vehicle braking.

Priority is claimed on Japanese Patent Application No. 2017-012231, filed Jan. 26, 2017, the content of which is incorporated herein by reference.

BACKGROUND ART

In a disk brake, a bush is provided in a pin hole of a support member into which a slide pin of a caliper is inserted (for example, see Patent Document 1). In addition, a bush is also provided on a slide pin of a caliper (for example, see Patent Document 2).

CITATION LIST

Patent Literature

[Patent Document 1]
Japanese Unexamined Patent Application, First Publication No. 2008-89012
[Patent Document 2]
Japanese Utility Model Publication No. H06-28366

SUMMARY OF INVENTION

Technical Problem

In a disk brake, it is desirable to minimize occurrence of abnormal noises.

The present invention is directed to providing a disk brake capable of minimizing occurrence of abnormal noises.

Solution to Problem

In a disk brake according to an aspect of the present invention, one of a pair of slide pins includes a pin main body having an annular groove on a tip side, and a tubular elastic deformation member having a plurality of convex sections on an inner circumferential side and provided in the annular groove.

Advantageous Effects of Invention

According to the above-mentioned disk brake, it is possible to minimize occurrence of abnormal noises.

DESCRIPTION OF EMBODIMENT

Figure 1:
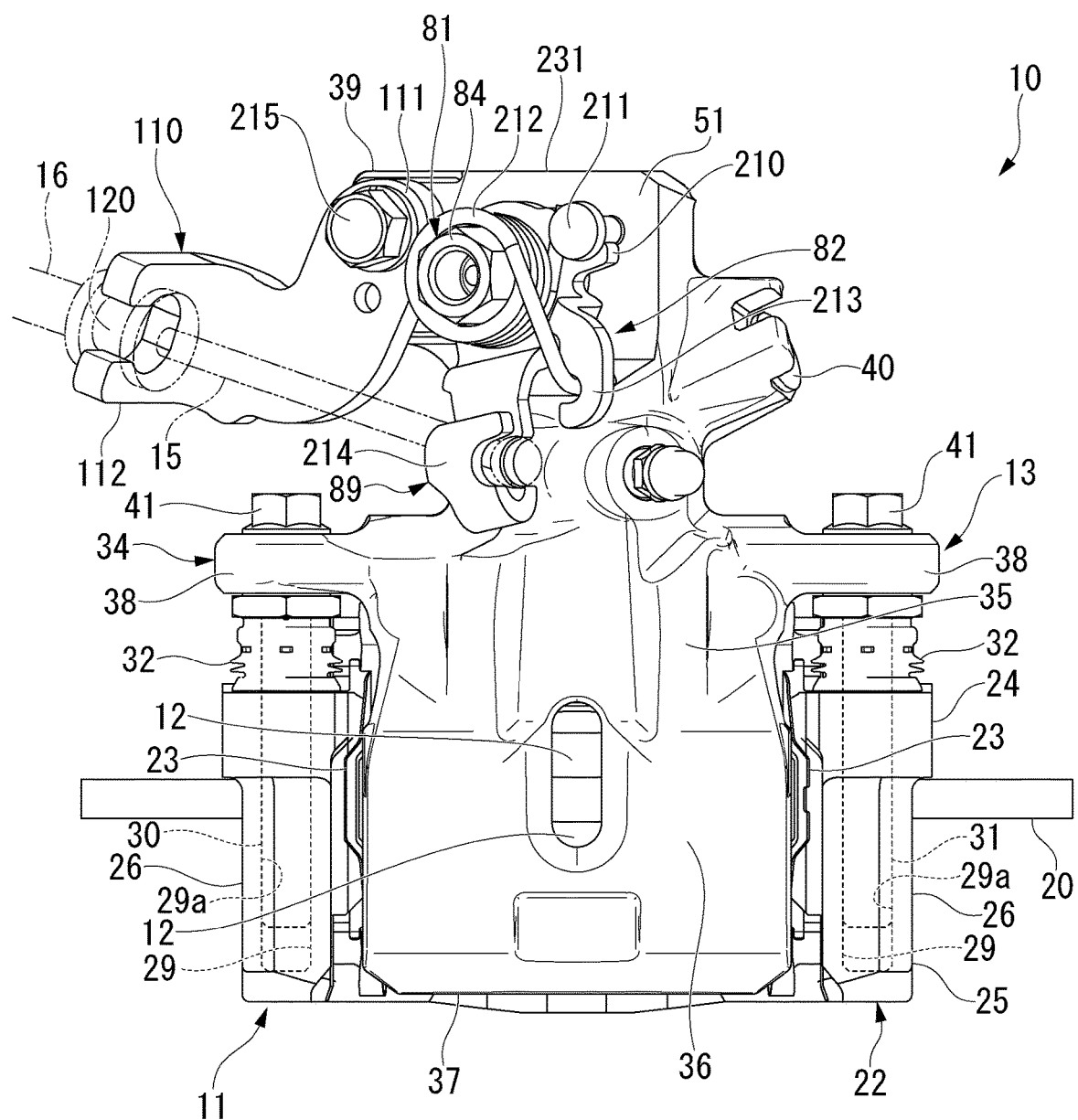
FIG. 1 is a plan view showing a disk brake of an embodiment.

An embodiment will be described below with reference to the accompanying drawings. A disk brake 10 of the embodiment applies a braking force to a vehicle. As shown in FIG. 1, the disk brake includes an attachment member 11, a pair of pads 12, a caliper 13, a wire 15 for a parking brake and a cable 16 for a parking brake.

The attachment member 11 is disposed to cross an outer diameter of a disk 20 having a circular plate shape that rotates with a wheel (not shown) that becomes a braking object, and fixed to a non-rotating section of a vehicle (not shown). The pair of pads 12 are supported by the attachment member 11 to be slidable in an axis direction of the disk 20 while being disposed to face each of surfaces of the disk 20. The caliper 13 is supported by the attachment member 11 to be slidable in the axis direction of the disk 20 while crossing the outer diameter side of the disk 20. The caliper 13 applies a frictional resistance to the disk 20 by bringing the pair of pads 12 into contact with both surfaces of the disk 20 and pressing the pads against the surfaces. Further, hereinafter, a radial direction in the disk 20 is referred to as a disk radial direction, an axial direction of the disk 20 is referred to as a disk axial direction, and a circumferential direction (a rotational direction) of the disk 20 is referred to as a disk circumferential direction.

The attachment member 11 has a carrier 22 integrally formed through casting and fixed to a non-rotating section of a vehicle (not shown), and a pair of pad guides 23 formed of a plate member through pressing and attached to the carrier 22. The carrier 22 has an inner pad support section 24 configured to support both sides in the disk circumferential direction of the pad 12 disposed inward that is inside in the vehicle width direction from the pair of pads 12 with the pair of pad guides 23 therebetween to be movable in the disk axial direction, an outer pad support section 25 configured to support both sides in the disk circumferential direction of the pad 12 disposed outward that is outside in the vehicle width direction via the pair of pad guides 23 to be movable in the disk axial direction, and a pair of pin support sections 26 away from each other in the disk circumferential direction, extending in the disk axial direction and configured to connect the inner pad support section 24 to the outer pad support section 25. The carrier 22 is disposed such that the pair of pin support sections 26 cross an outer circumferential side of the disk 20.

In the carrier 22, a pair of pin holes 29 extending from the inner side in the disk axial direction are formed in the pair of pin support sections 26 that are disposed on the outer side in the disk radial direction at both ends in the disk circumferential direction. A pair of slide pins 30 and 31 provided on both sides of the caliper 13 in the disk circumferential direction are slidably inserted into the pair of pin holes 29 from the inner side to slidably move in the disk axial direction. That is, the one slide pin 30 is inserted into the one pin hole 29 formed in the one pin support section 26, and the other slide pin 31 is inserted into the other pin hole 29 formed in the other pin support section 26. When the pair of slide pins 30 and 31 are inserted into the pair of pin holes 29, the caliper 13 having the pair of slide pins 30 and 31 is supported by the attachment member 11 having the pair of pin holes 29 to be movable in the disk axial direction. Portions of the pair of slide pins 30 and 31 protruding from the carrier 22 are covered with a pair of boots 32 that are extendable.

The caliper 13 has a caliper body 34 supported by the attachment member 11 via the pair of slide pins 30 and 31 in a state in which the pair of slide pins 30 and 31 are attached to both end portions in the disk circumferential direction and cross the disk 20. The caliper body 34 has a cylinder section 35, a bridge section 36, a claw section 37, a pair of arm sections 38, a guide attachment section 39 and a hose attachment section 40, which are integrally formed through casting.

The caliper 13 is a so-called first type caliper in which the caliper body 34 has the cylinder section 35 disposed on the inner side that is one side of the disk 20 in the axial direction, the claw section 37 disposed on the outer side that is the other side of the disk 20 in the axial direction, and the bridge section 36 configured to connect the claw section 37 and the cylinder section 35 and provided to cross the disk 20. The pair of slide pins 30 and 31 provided along the disk axial direction and protruding toward the claw section 37 are fixed to the pair of arm sections 38. The pair of slide pins 30 and 31 are fixed to the pair of arm sections 38 by a pair of bolts 41 screwed from the inner side.

Figure 2:
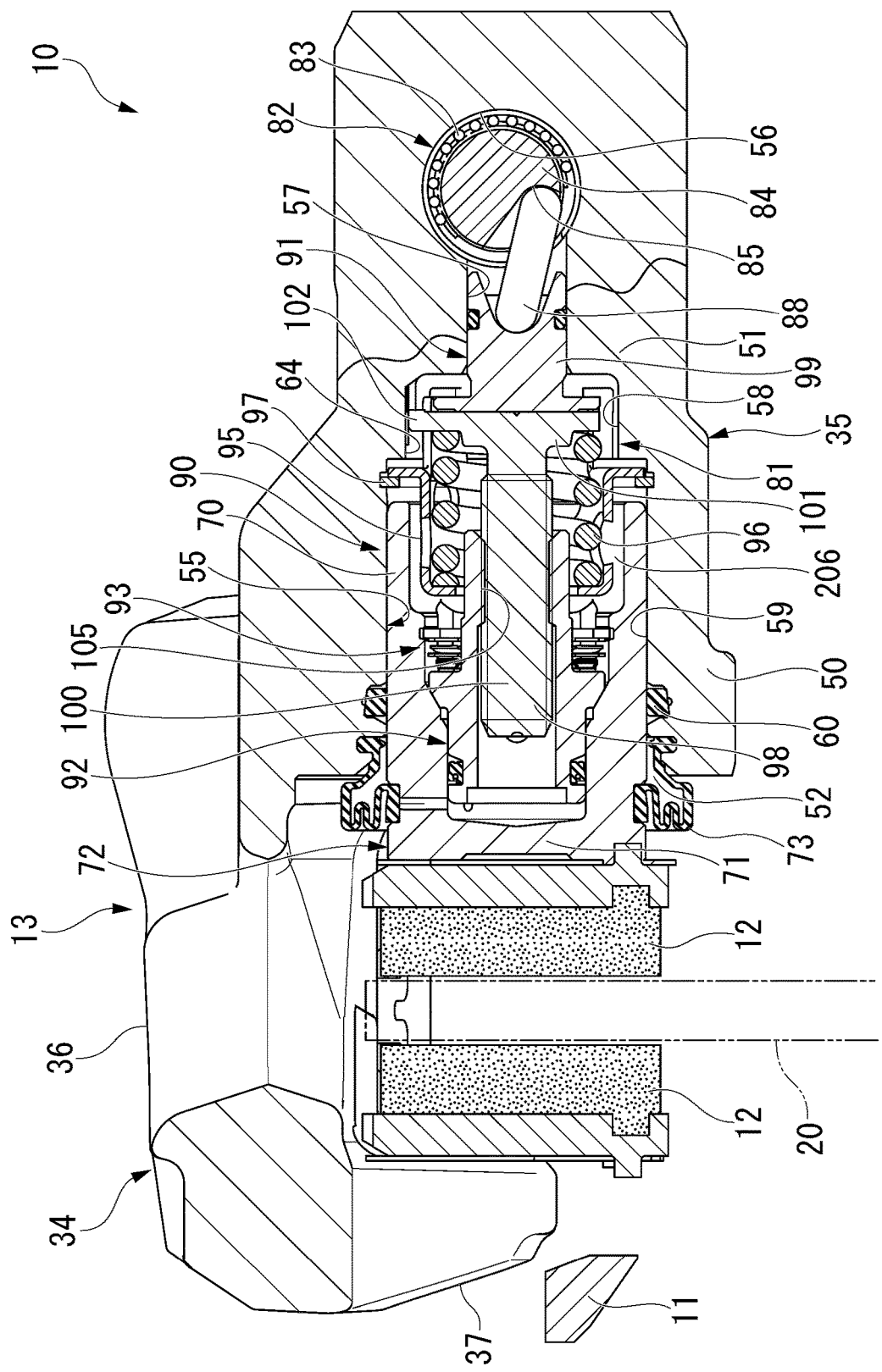
FIG. 2 is a cross-sectional view showing the disk brake of the embodiment.

As shown in FIG. 2, the cylinder section 35 of the caliper body 34 is formed in a bottomed tubular shape having a cylinder tube section 50 with a tubular shape, and a cylinder bottom section 51 provided to close one end of the cylinder tube section 50 in the axial direction. The cylinder section 35 of the caliper body 34 is arranged such that a cylinder opening section 52 faces the pad 12 on the inner side. Here, an inner circumferential surface and a bottom surface of the cylinder tube section 50 are referred to as a bore 55. The bore 55 is formed in the cylinder section 35, and the cylinder bottom section 51 is a bore bottom in the cylinder section 35. In the caliper body 34, when the pair of slide pins 30 and 31 attached thereto are slidably fitted into the pair of pin holes 29 of the carrier 22 as shown in FIG. 1, a center axis of the bore 55 of the cylinder section 35 is parallel to a center axis of the disk 20 as shown in FIG. 2. That is, in the caliper body 34, the axial direction of the cylinder section 35 coincides with the disk axial direction.

In the caliper body 34, a placement hole 56 having a circular cross section along a direction perpendicular to the axial direction of the cylinder section 35 is formed in the cylinder bottom section 51. In addition, a communication hole 57 passing from a center position of the bottom surface of the bore 55 to the placement hole 56 in the axial direction of the cylinder section 35 is formed in the cylinder bottom section 51.

A depth position hole 58 is formed in an inner circumference of the bore 55 of the cylinder tube section 50 of the caliper body 34 at a side closest to the cylinder bottom section 51, and a sliding hole 59 having a diameter larger than that of the depth position hole 58 is formed at a side closer to the cylinder opening section 52 than the depth position hole 58. A piston seal 60 configured to seal a space between a piston 72 (to be described below) and the cylinder section 35 is held in the vicinity of an end portion of the sliding hole 59 opposite to the depth position hole 58. An axial groove 64 having a concave shape, recessed in the radial direction and extending in the axial direction is formed in an inner circumferential surface of the depth position hole 58 of the cylinder tube section 50.

The caliper 13 has the piston 72 formed in a covered tubular shape having a tube section 70 with a cylindrical shape and a lid section 71 with a circular plate shape. The piston 72 is accommodated in the bore 55 formed in the cylinder section 35 of the caliper body 34, and specifically, slidably fitted into the sliding hole 59 of the bore 55 in a posture in which the tube section 70 side is directed toward the cylinder bottom section 51.

The caliper 13 has an extendable boot 73 configured to cover a gap between the piston 72 and the bore 55 of the cylinder section 35, and disposed between an inner circumferential section of the cylinder section 35 on the side of the cylinder opening section 52 and an outer circumferential section of the piston 72 on the side of the lid section 71.

In the caliper 13, a brake hose (not shown) is attached to the hose attachment section 40 shown in FIG. 1. A brake liquid from the brake hose is introduced into a chamber 206 between the cylinder section 35 and the piston 72 shown in FIG. 2. The piston 72 slidably fitted into the bore 55 is slid in the sliding hole 59 of the cylinder section 35 to be moved in a direction of the pads 12 from the cylinder section 35 by a liquid pressure of the brake liquid introduced into the chamber 206. The caliper 13 brings the pads 12 in contact with the disk 20 by gripping the pair of pads 12 using the piston 72 and the claw section 37 from both sides while sliding with respect to the attachment member 11 according to movement of the piston 72. In other words, the pair of pads 12 movably supported by the attachment member 11 are pressed against both surfaces of the disk 20 by the caliper 13.

During normal braking due to an operation of depressing a brake pedal (not shown), in the caliper 13, a brake liquid pressure is introduced to the chamber 206 between the cylinder section 35 and the piston 72 via the brake hose from a master cylinder (not shown). Then, the piston 72 slides through the cylinder section 35 and protrudes in a direction of the claw section 37 from the cylinder section 35 using the introduced brake liquid pressure, and thus, brings the pair of pads 12 in contact with the disk 20 to generate a braking force. On the other hand, the caliper 13 has a parking brake mechanism 81 disposed in the caliper body 34 and configured to press the pair of pads 12 against the disk 20 to generate a braking force by mechanically propelling the piston 72 provided in the caliper body 34 without using such a brake liquid pressure. In other words, the parking brake mechanism 81 is provided in the caliper body 34 that is to propel the piston 72. That is, the caliper 13 is a built-in caliper in which the parking brake mechanism 81 is installed.

The parking brake mechanism 81 has a cam mechanism 82 accommodated in the cylinder section 35. The cam mechanism 82 has an arc-shaped bearing 83 fitted into the placement hole 56 of the caliper body 34, and a substantially columnar rotating member 84 disposed in the placement hole 56 and rotatably supported by the placement hole 56 via the bearing 83. A cam concave section 85 concaved in a substantially V shape from an outer circumferential surface in the radial direction toward a central direction is formed in the rotating member 84. In the cam concave section 85, the furthest recessed position is offset with respect to a center axis of the rotating member 84.

The cam mechanism 82 has a cam rod 88 having one end side inserted into the cam concave section 85 and the other end side disposed in the communication hole 57, and the cam rod 88 varies a protrusion amount from the rotating member 84 according to a shape of the cam concave section 85 when the rotating member 84 is driven to rotate about an axis in a direction perpendicular to the axis of the cylinder section 35. That is, the cam concave section 85 varies a protrusion amount of the cam rod 88 abutting the bottom section toward the communication hole 57 by moving the position of the bottom section to advance or retreating with respect to the communication hole 57 when the rotating member 84 is rotated as the bottom section is offset with respect to a center of the rotating member 84.

Here, as shown in FIG. 1, the rotating member 84 disposed in the placement hole 56 partially protrudes outward from the cylinder bottom section 51 of the caliper body 34, and a lever member 89 is connected to a protrusion portion of the rotating member 84. The rotating member 84 is fixed to the lever member 89, and rotated integrally with the lever member 89 when the lever member 89 is driven to rotate.

A stopper member 211 abutting an abutting section 210 of the lever member 89 and configured to restrict further rotation of the lever member 89 is fixed to the cylinder bottom section 51 of the caliper body 34. A spring 212 configured to rotate and bias the lever member 89 in a direction of abutting the stopper member 211 in the abutting section 210 is provided on the rotating member 84. The spring 212 is supported by the rotating member 84 when the rotating member 84 is inserted into a coil portion of an intermediate section, one end side is locked to a spring locking section 213 of the lever member 89, and the other end side is locked to the stopper member 211. A wire locking section 214 configured to lock a wire 15 is formed on the lever member 89 parallel to the spring locking section 213.

As shown in FIG. 2, the parking brake mechanism 81 has a linear motion transmission mechanism 90 accommodated in the cylinder section 35, pressed by the cam rod 88 of the cam mechanism 82 and moved in the axial direction of the cylinder section 35. The linear motion transmission mechanism 90 has a push rod 91, a clutch member 92, an adjustment section 93 configured to adjust positions of the push rod 91 and the clutch member 92, a cover member 95 and a push rod biasing spring 96. In the linear motion transmission mechanism 90, the cover member 95 is locked to the cylinder section 35 by a C-shaped retaining ring 97 and movement in a direction of the cylinder opening section 52 is restricted.

The push rod 91 is constituted by a tip member 98 on the side of the disk 20, and a base end member 99 opposite to the disk 20, and the tip member 98 has a screw shaft section 100 and a flange section 101 having a substantially circular plate shape. A convex section 102 protruding outward in the radial direction is formed in an outer circumferential section of the flange section 101. The convex section 102 is fitted into the axial groove 64 of the depth position hole 58 of the cylinder tube section 50, and thus, rotation of the tip member 98 with respect to the cylinder section 35 is restricted. The clutch member 92 has a female screw 105 screwed onto the screw shaft section 100 of the tip member 98.

In the parking brake mechanism 81, the cam rod 88 presses the base end member 99 of the push rod 91 by rotating the cam mechanism 82 via the lever member 89. According to the pressing, the push rod 91 and the clutch member 92 are linearly moved in the axial direction to press the piston 72, and the piston 72 is forcibly slid toward the pads 12 with respect to the cylinder section 35. That is, the parking brake mechanism 81 generates a pressing force in a moving direction of the piston 72 using a rotation input to the lever member 89. The adjustment section 93 adjusts a screwed amount between the screw shaft section 100 of the tip member 98 of the push rod 91 and the female screw 105 of the clutch member 92 according to the wearing of the pair of pads 12.

As shown in FIG. 1, the caliper 13 has a cable guide member 110 fixed to the guide attachment section 39 protruding from the cylinder bottom section 51 of the caliper body 34 in the disk circumferential direction using a bolt 215. Since the cable guide member 110 guides routing of a cable 16 toward a parking brake input mechanism (not shown), an attachment base section 111 fixed to the guide attachment section 39 is provided on one end side, and a cable locking section 112 configured to lock a connecting section 120 of a distal end of the cable 16 that contains the wire 15 is provided on the other end side. The cable locking section 112 stands upright from the attachment base section 111 in a direction opposite to that of the guide attachment section 39. The wire 15 contained in the cable 16 and extending from a distal end portion of the cable 16 has a distal end portion locked to the wire locking section 214 of the lever member 89. Accordingly, the lever member 89 transmits a force from the wire 15 to the parking brake mechanism 81.

The wire 15 is pulled with respect to the cable 16 shown in FIG. 1 in a direction in which an extension amount is reduced by the parking brake input mechanism (not shown) (a parking brake lever for a manual operation, a parking brake pedal for a stepping operation, an electromotive cable puller by motor driving or the like, and so on). When the wire 15 is pulled with respect to the cable 16, the lever member 89 and the rotating member 84 are rotated integrally. Then, in the parking brake mechanism 81, the rotating member 84 presses the push rod 91 via the cam rod 88 shown in FIG. 2. The clutch member 92 is linearly moved in the axial direction to press the piston 72 by pressing of the push rod 91, and the piston 72 is forcibly slid toward the pads 12 with respect to the cylinder section 35. As a result, the piston 72 and the claw section 37 press the pair of pads 12 against the disk 20 to generate a braking force.

Figure 3:
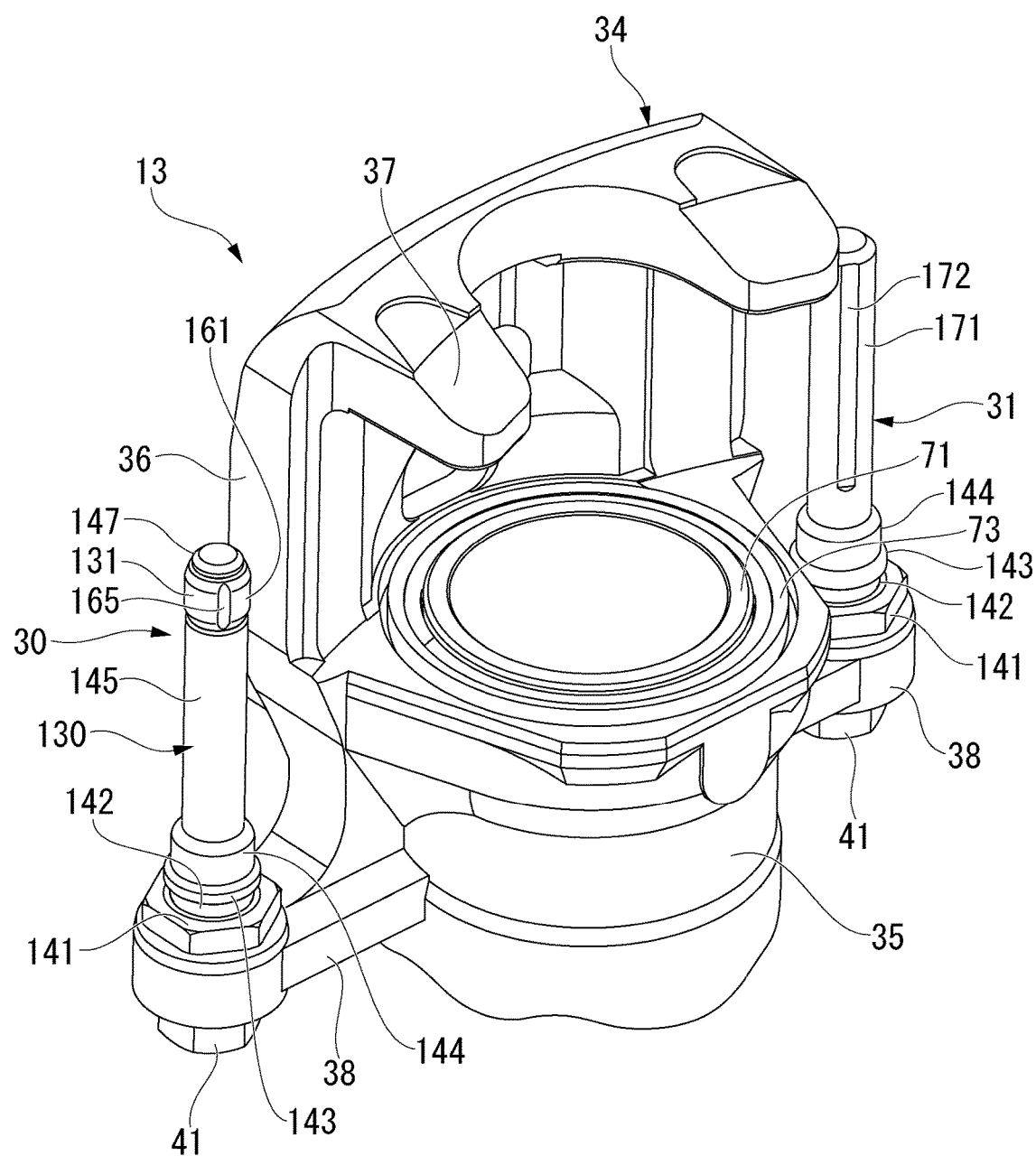
FIG. 3 is a partial perspective view showing a caliper of the disk brake of the embodiment.

As shown in FIG. 3, the one slide pin 30 of the pair of slide pins 30 and 31 is constituted by two parts of a pin main body 130 and a bush 131 (an elastic deformation member). The pin main body 130 is an integrally molded article formed of a metal, and the bush 131 is an integrally molded article formed of a resin.

Figure 4:
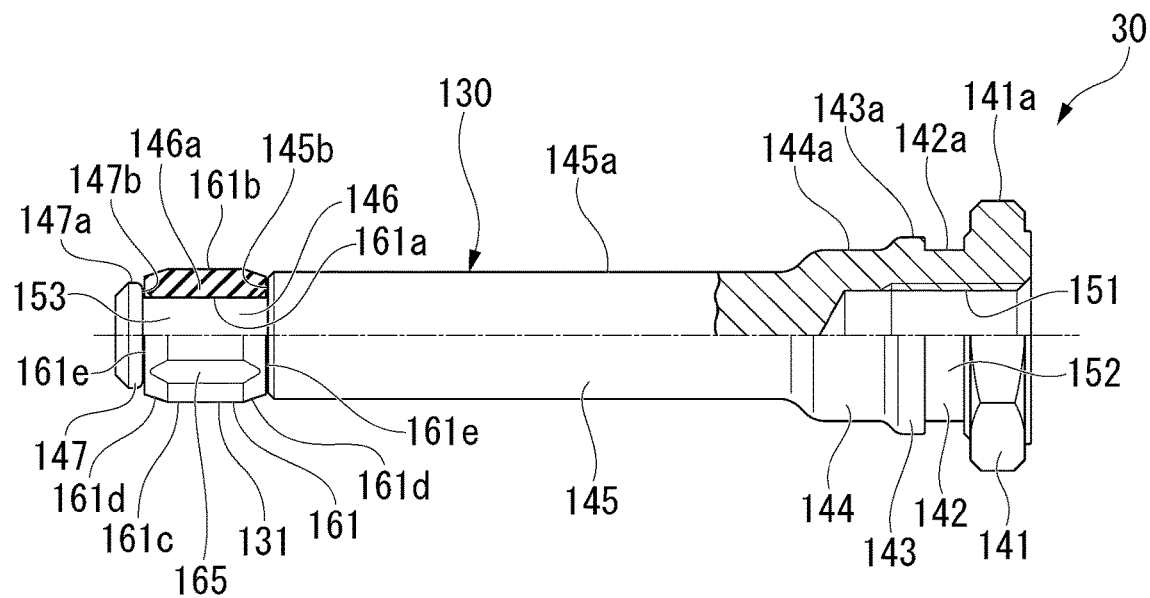
FIG. 4 is a side view showing a slide pin of the disk brake of the embodiment, one side of which is cut away from a centerline thereof.

As also shown in FIG. 4, a tool engaging section 141 having a hexagonal outer circumferential surface 141a with which a tool is engaged, a boot fitting section 142 having a cylindrical outer circumferential surface 142a having a diameter smaller than that of a minimum diameter of the tool engaging section 141, a boot locking section 143 having a cylindrical outer circumferential surface 143a having a diameter larger than that of the outer circumferential surface 142a of the boot fitting section 142, an intermediate shaft section 144 having a cylindrical outer circumferential surface 144a having a diameter smaller than that of the boot locking section 143, a large diameter section 145 having a cylindrical outer circumferential surface 145a having a diameter smaller than that of the intermediate shaft section 144, a small diameter section 146 having a cylindrical outer circumferential surface 146a having a diameter smaller than that of the large diameter section 145, and a tip flange section 147 having a cylindrical outer circumferential surface 147a having a diameter larger than that of the small diameter section 146 are provided on an outer circumferential side of the pin main body 130 in sequence from one end side in the axial direction.

Among the tool engaging section 141, the boot fitting section 142, the boot locking section 143, the intermediate shaft section 144, the large diameter section 145, the small diameter section 146 and the tip flange section 147, the large diameter section 145 is formed in a spindle shape having a largest axial length.

A screw hole 151 is formed in a center of the tool engaging section 141, the boot fitting section 142, the boot locking section 143 and the intermediate shaft section 144 in the radial direction. As shown in FIG. 3, the slide pin 30 is fixed to the one arm section 38 by the bolt 41 in a state in which the pin main body 130 abuts the one arm section 38 of the caliper body 34 in the tool engaging section 141. Here, the bolt 41 is screwed into the screw hole 151 of the pin main body 130 shown in FIG. 4 after being inserted into through-hole (not shown) of the one arm section 38. When protruding from the arm section 38, in the pin main body 130 attached to the arm section 38, the tool engaging section 141 is formed on a base end side in a protrusion direction and the small diameter section 146 is formed on a tip side in the protrusion direction.

In the pin main body 130, a boot fitting groove 152 is formed by the tool engaging section 141, the boot fitting section 142 and the boot locking section 143 using the outer circumferential surface 142*a* of the boot fitting section 142 as a groove bottom surface, and one end portion of the boot 32 shown in FIG. 1 is fitted into the boot fitting groove 152.

As shown in FIG. 4, in the pin main body 130, an annular bush holding groove 153 (an annular groove) is formed by the large diameter section 145, the small diameter section 146 and the tip flange section 147 using the outer circumferential surface 146*a* of the small diameter section 146 as a groove bottom surface and using an end surface 145*b* widening in a direction perpendicular to the axis of the large diameter section 145 on the side of the small diameter section 146 and an end surface 147*b* widened in a direction perpendicular to the axis of the tip flange section 147 on the side of the small diameter section 146 as both sidewall surfaces. An outer circumferential surface of the bush holding groove 153 has the outer circumferential surface 146*a* (a small diameter section) having a diameter smaller than that of the outer circumferential surface 145*a* of the large diameter section 145 on the base end side. In the pin main body 130, the bush 131 is provided to be fitted into the bush holding groove 153. In the large diameter section 145 and the tip flange section 147, a diameter of the outer circumferential surface 145*a* is larger than that of the outer circumferential surface 147*a*, and an outer diameter of the end surface 145*b* is larger than that of the end surface 147*b*. The bush holding groove 153 that is an annular groove including the small diameter section 146 is formed in the pin main body 130 on a tip side thereof.

Figure 5:
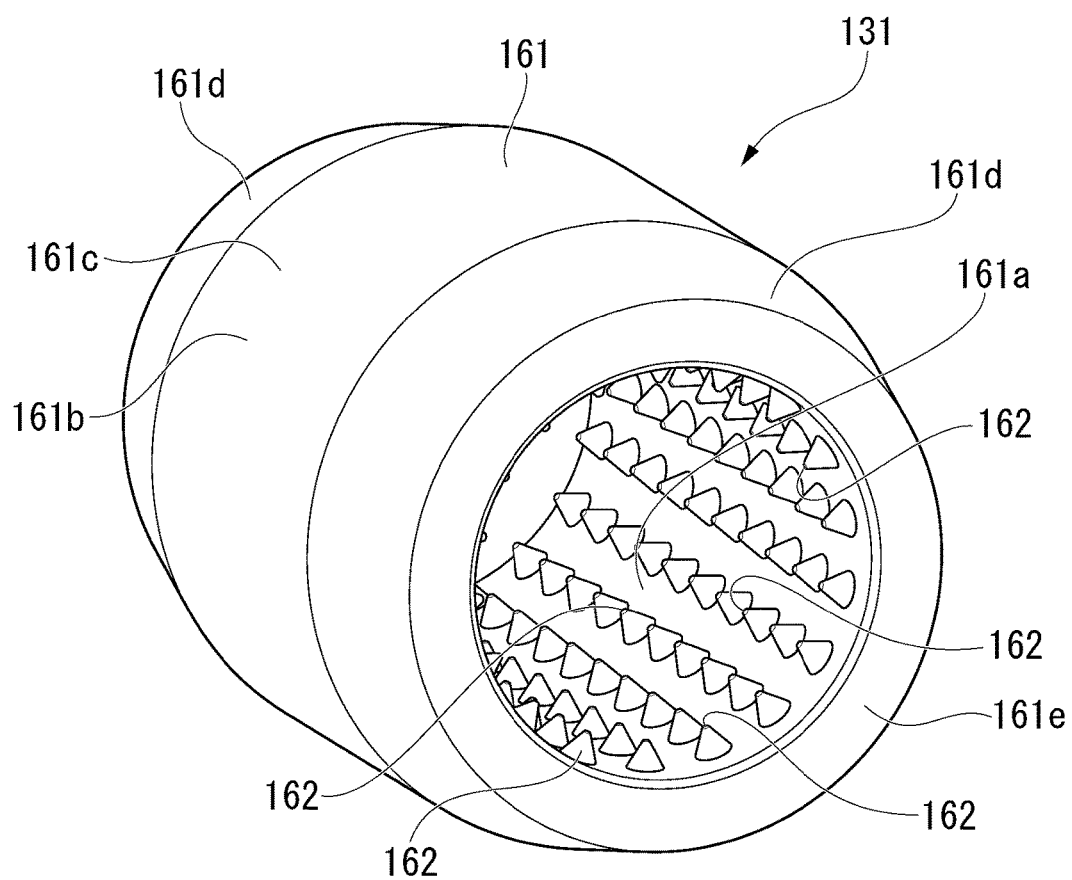
FIG. 5 is a perspective view of a bush of the disk brake of the embodiment.

As shown in FIG. 5, the bush 131 is formed in a tubular shape and integrally formed of a resin that is elastically deformable. The bush 131 has a mirror symmetrical shape with reference to a center in the axial direction. The bush 131 has a main body section 161 having a cylindrical shape, and a plurality of dot-shaped convex sections 162 protruding inward from an inner circumferential surface 161*a* of a cylindrical surface shape of the main body section 161 in the radial direction of the inner circumferential surface 161*a*. Accordingly, the bush 131 has the plurality of convex sections 162 on an inner circumferential side.

An outer circumferential surface 161*b* of the main body section 161 has an outermost circumferential surface 161*c* having a cylindrical surface shape, and a pair of end-side outer circumferential surfaces 161*d* having a tapered surface shape and extending outward in the axial direction from both edge portions of the outermost circumferential surface 161*c* in the axial direction to have a diameter that reduces going outward in the axial direction. In the main body section 161, a pair of end surfaces 161*e* on both ends in the axial direction are formed in a flat surface shape that widens in the direction perpendicular to the axis to connect edge portions of the pair of end-side outer circumferential surfaces 161*d* opposite to the outermost circumferential surface 161*c* and each of end portions of the inner circumferential surface 161*a* in the axial direction.

The plurality of convex sections 162 all have the same shape and the same size and are arranged in rows in the axial direction of the main body section 161 at equal intervals, and such rows are disposed to be arranged in the circumferential direction of the main body section 161 at equal intervals. In other words, the plurality of convex sections 162 are disposed in a lattice shape, i.e., intersection points of a lattice in which the inner circumferential surface 161*a* of the main body section 161 is deployed in a flat surface shape.

The plurality of convex sections 162 are formed in a tapered shape having a cross-sectional area in a surface perpendicular to the protrusion direction and that decreases in size as it protrudes from the inner circumferential surface 161*a* of the main body section 161. The convex section 162 is formed in a conoidal shape, specifically, a conical shape. The convex section 162 is not limited to a conical shape and may have another tapered shape such as a polygonal conical shape or the like.

Figure 6:
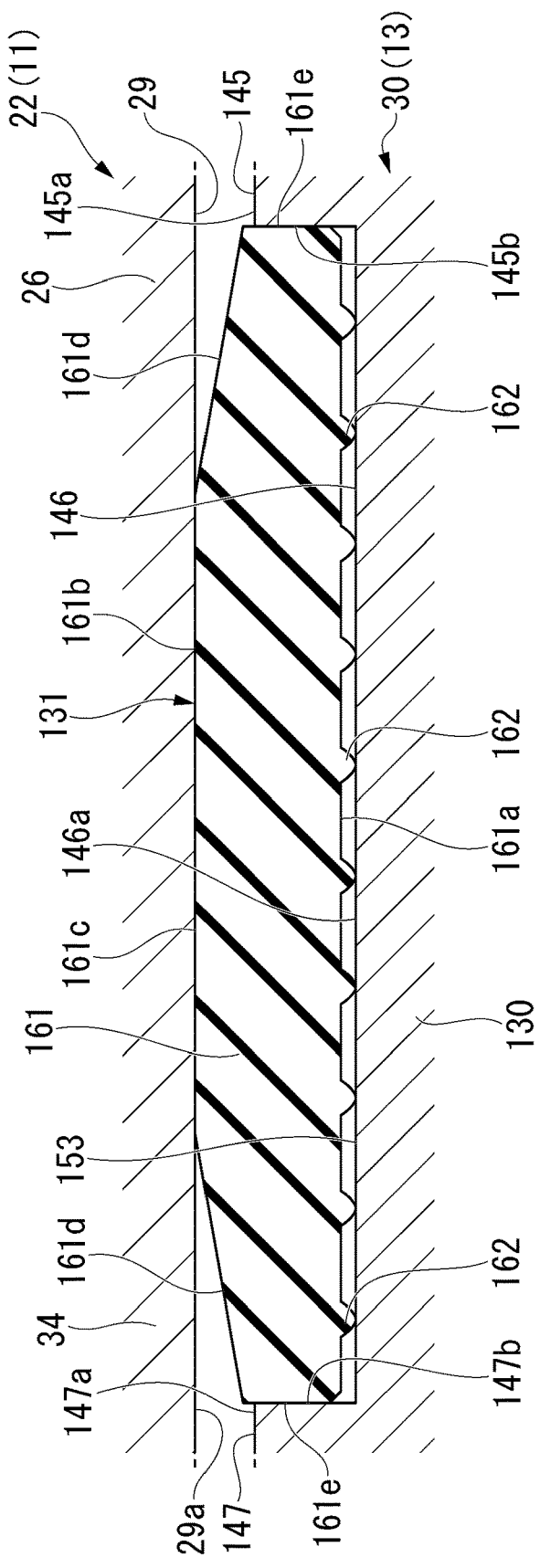
FIG. 6 is an enlarged cross-sectional view of a major part showing a pin support section and the slide pin of the disk brake of the embodiment.

As shown in FIG. 6, the axial length of the main body section 161, i.e., the axial length of the bush 131 is substantially the same as that of the bush holding groove 153 of the pin main body 130. In addition, tip portions of all the convex sections 162 of the bush 131 pass through the common cylindrical surface, and a diameter of the cylindrical surface is smaller than the outer diameter of the small diameter section 146 of the pin main body 130, i.e., a diameter of the outer circumferential surface 146*a*. Accordingly, the bush 131 is disposed in the bush holding groove 153, and the plurality of convex sections 162 are fitted onto the small diameter section 146 of the pin main body 130 with interference. Here, tips of the plurality of convex sections 162 abut the outer circumferential surface 146*a* of the small diameter section 146 with interference. In other words, the bush 131 abuts the small diameter section 146 of the pin main body 130 in a state in which the plurality of convex sections 162 are elastically deformed in the protrusion direction thereof (the radial direction of the main body section 161). In the bush 131 while being provided in the small diameter section 146 in this way, when no external force is applied, only the plurality of convex sections 162 come in contact with the small diameter section 146.

In the bush 131 while being fitted into the small diameter section 146, inner diameters of both of the end surfaces 161*e* are smaller than an outer diameter of the end surface 145*b* of the large diameter section 145 and the end surface 147*b* of the tip flange section 147. Accordingly, both of the end surfaces 161*e* overlap the end surfaces 145*b* and 147*b* in the radial direction throughout the circumference. For this reason, the bush 131 is held in the bush holding groove 153 in a state in which a deviation from the bush holding groove 153 is restricted. The bush 131 is elastically deformable with respect to the pin main body 130 also in the axial direction because the entire bush 131 is elastically deformable.

As shown in FIG. 4, an outer circumferential groove 165 passing through the outermost circumferential surface 161c in the axial direction and extending to an intermediate position of the pair of end-side outer circumferential surfaces 161d in the axial direction is formed in the main body section 161 of the bush 131 on the outer circumferential side. A brake liquid flows through the outer circumferential groove 165 according to a volume variation of a chamber on the bottom section side with respect to the bush 131 of the pin hole 29 and generated during movement of the slide pin 30.

In the slide pin 30, the large diameter section 145 of the pin main body 130, the small diameter section 146 and the tip flange section 147, and the bush 131 held in the pin main body 130 are inserted into the pin holes 29 of the attachment member 11 shown in FIG. 6. In this state, the bush 131 comes in contact with an inner circumferential surface 29a of the pin hole 29 with interference, and the large diameter section 145 and the tip flange section 147 of the pin main body 130 have a gap with respect to the inner circumferential surface 29a of the pin hole 29 in the radial direction. In a state in which the large diameter section 145 of the pin main body 130 and the pin hole 29 of the attachment member 11 are coaxial with each other, the main body section 161 of the bush 131 is elastically deformable inside in the radial direction throughout the circumference, and the inner circumferential surface 161a of the main body section 161 does not come in contact with the small diameter section 146.

The other slide pin 31 of the pair of slide pins 30 and 31 shown in FIG. 3 is constituted by one part and formed of a metal. Like the pin main body 130, the slide pin 31 has the tool engaging section 141, the boot fitting section 142, the boot locking section 143 and the intermediate shaft section 144. In the slide pin 31, a main shaft section 171 having a diameter larger than that of the large diameter section 145 of the pin main body 130 extends to a tip thereof at a side opposite to the boot locking section 143 of the intermediate shaft section 144. That is, the large diameter section 145, the small diameter section 146 and the tip flange section 147, which are formed on the pin main body 130, are not formed on the slide pin 31. An outer circumferential groove 172 extending in the axial direction is formed in the main shaft section 171. The brake liquid flows through the outer circumferential groove 172 according to a volume variation of the chamber closer to the bottom section than the slide pin 31 of the pin hole 29 and generated during movement of the slide pin 31.

The main shaft section 171 of the slide pin 31 is slidably inserted into the pin hole 29. Here, as shown in FIG. 1, the pair of pin holes 29 into which the pair of slide pins 30 and 31 are inserted have the same inner diameter, i.e., the inner circumferential surfaces 29a have the same diameter. The slide pin 31 is slidably fitted into the pin hole 29 with a gap narrower than the pin main body 130 of the slide pin 30 in the main shaft section 171 shown in FIG. 3. Here, in the pair of slide pins 30 and 31, the slide pin 30 is disposed on an outlet side in the disk rotational direction during advance of the vehicle, and the slide pin 31 is disposed on an inlet side in the disk rotational direction during advance of the vehicle.

The piston 72 is moved toward the disk 20 and presses the pads 12 on the inner side against the disk 20 using a propulsive force due to a brake liquid pressure generated by a stepping operation of a brake pedal (not shown) and a propulsive force due to the parking brake mechanism 81 generated by an operation to a parking brake input mechanism (not shown). Then, the caliper body 34 moves the claw section 37 toward the disk 20 while slightly moving the pair of slide pins 30 and 31 attached thereto in an extraction direction in the pair of pin holes 29 using a reaction force thereof and presses the pad 12 on the outer side against the disk 20 using the claw section 37. As a result, the piston 72 and the claw section 37 press the pair of pads 12 against the disk 20 to generate a braking force. In this way, during movement of the piston 72, as shown in FIG. 2, the piston seal 60 having an outer circumferential surface side in contact with the caliper body 34 and an inner circumferential surface side in contact with the piston 72 is elastically deformed as the inner circumferential surface side is moved together with the piston seal 60 by a frictional force.

Figure 7A:
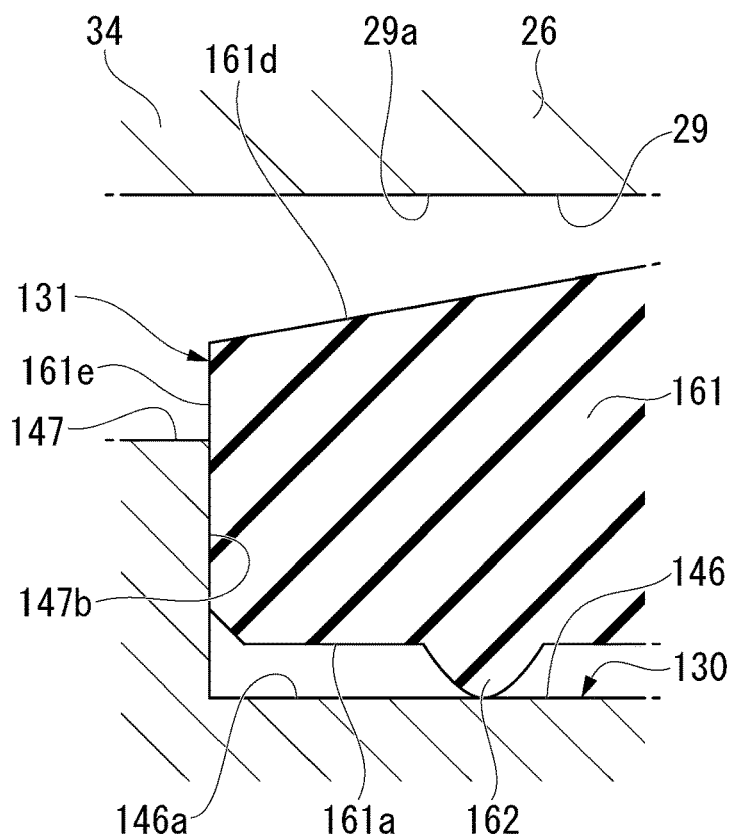
FIG. 7A is an enlarged cross-sectional view of the major part showing the pin support section and the slide pin of the disk brake of the embodiment.
Figure 7B:
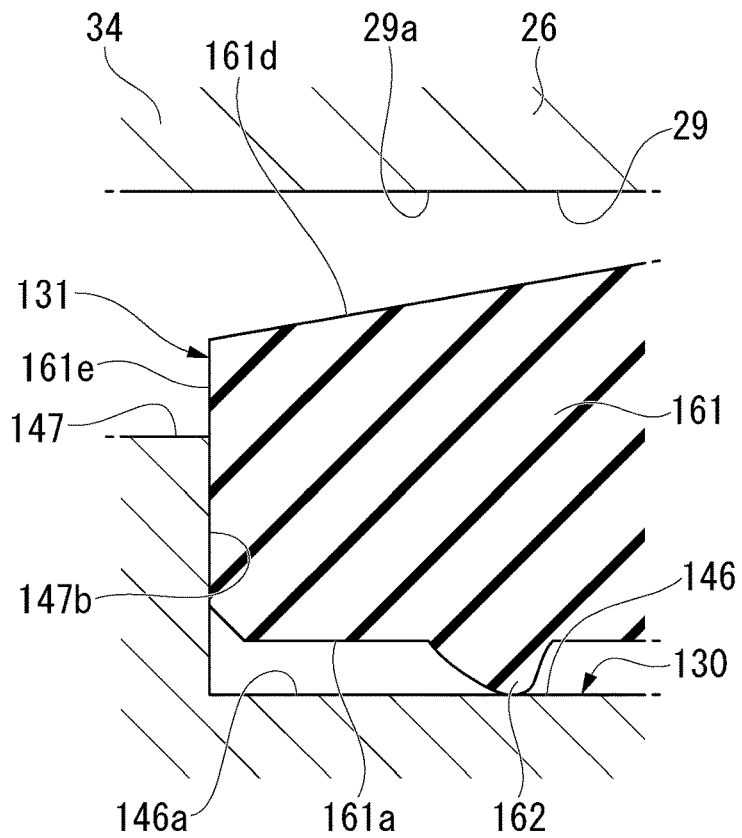
FIG. 7B is an enlarged cross-sectional view of the major part showing the pin support section and the slide pin of the disk brake of the embodiment.

In this way, when the pair of slide pins 30 and 31 are moved in the pair of pin holes 29 in the extraction direction, the pin main body 130 of the slide pin 30 is moved integrally with the caliper body 34. Here, as shown in FIG. 6, the bush 131 formed of an elastic member is maintained such that the outer circumferential surface 161b side of the main body section 161 in contact with the inner circumferential surface 29a of the pin hole 29 does not move with respect to the pin hole 29 due to the frictional force with the inner circumferential surface 29a. Then, the plurality of convex sections 162 in contact with the outer circumferential surface 146a of the small diameter section 146 of the pin main body 130 are elastically deformed as shown in FIG. 7B to follow movement of the pin main body 130 such that the tip sides thereof are moved together with the pin main body 130 by the frictional force with the outer circumferential surface 146a from a state shown in FIG. 7A. That is, during braking, the bush 131 follows movement of the pin main body 130 with respect to the pin holes 29 in the extraction direction with deflection of the plurality of convex sections 162 with almost no sliding with respect to the pin holes 29. Here, the main body section 161 of the bush 131 is pressed against the end surface 147b of the tip flange section 147 of the pin main body 130, and the end surfaces 161e side abutting the end surface 147b is slightly elastically deformed.

Due to operation release of the brake pedal (not shown) and operation release to the parking brake input mechanism (not shown), the piston 72 and the caliper body 34 are relatively moved by recovery (rollback) of elastic deformation of the piston seal 60 shown in FIG. 2, and the piston 72 and the claw section 37 are separated from each other. Here, the pin main body 130 of the slide pin 30 moves with respect to the pin hole 29 in the advance direction. Here, the bush 131 formed of an elastic member is maintained such that the outer circumferential surface 161b side of the main body section 161 in contact with the inner circumferential surface 29a of the pin holes 29 does not move with respect to the pin holes 29 due to the frictional force with the inner circumferential surface 29a. Then, the plurality of convex sections 162 in contact with the outer circumferential surface 146a of the small diameter section 146 of the pin main body 130 are recovered from the elastic deformation as shown in FIG. 7A and follow movement of the pin main body 130 from the deformed state shown in FIG. 7B such that the tip sides thereof are moved together with the pin main body 130 due to the frictional force with the outer circumferential surface 146a. That is, during braking release, the bush 131 follows movement of the pin main body 130 with respect to the pin hole 29 in the advance direction due to recovery of deflection of the plurality of convex sections 162 with almost no sliding with respect to the pin hole 29. Here, in the main body section 161 of the bush 131, the pressing by the end surface 147b of the tip flange section 147 of the pin main body 130 is also released, and the end surfaces 161e side pressed against the end surface 147b is recovered from the elastic deformation. For example, an elastic deformation amount of the plurality of convex sections 162 in the axial direction of the main body section 161 is set to an amount at which movement in the axial direction of the pads 12 on the outer side, i.e., the caliper body 34 and the pin main body 130 abutting the pads 12 by the claw section 37 due to rocking of the disk 20.

Here, the elastic deformation amount of the plurality of convex sections 162 in the axial direction of the main body section 161 is set to be the same as a maximum movement $D_{max}$ of the pin main body 130 by the braking with respect to the pin hole 29 and a movement $D_{elastic}$ of the pin main body 130 recovered after the braking release with respect to the pin hole 29.

As described above, since the bush 131 follows movement in the axial direction of the pin main body 130 with respect to the pin hole 29 due to elastic deformation and recovery of the elastic deformation during braking and braking release, the piston 72 and the claw section 37 during braking release cannot easily become resistance in movement in a direction away from the disk 20. Accordingly, it is possible to minimize occurrence of abnormal noises due to dragging of the pads 12.

On the other hand, during wearing of the pads 12, the bush 131 follows the wearing of the pads 12 by pressing the main body section 161 in contact with the inner circumferential surface 29a of the pin hole 29 against the end surface 147b of the tip flange section 147 of the pin main body 130 and sliding the outer circumferential surface 161b with respect to the inner circumferential surface 29a. Here, the bush 131 cannot be easily worn because the inner circumferential surface 29a of the pin hole 29 is slid in the main body section 161 having high stiffness and a large contact area. In addition, here, since the main body section 161 abuts the end surface 147b of the tip flange section 147 of the pin main body 130 and restricts movement of the bush 131 with respect to the pin main body 130, sliding of the plurality of convex sections 162 with respect to the pin main body 130 can be minimized. Accordingly, the bush 131 cannot easily generate time degradation such as a decrease in interference or the like, and can minimize occurrence of abnormal noises due to rattling of the pads 12.

In this way, occurrence of abnormal noises due to dragging and rattling of the pads 12 can be minimized by separating, in the bush 131, an area elastically deformed during braking as the plurality of convex sections 162 that are easily elastically deformed on an inner circumferential side and an area sliding with respect to the inner circumferential surface 29a of the pin hole 29 as the main body section 161 having high stiffness on an outer circumferential side.

Patent Document 1 discloses a configuration in which a groove is formed in a region facing a base end side of a sub pin on an inner circumferential side of a pin hole into which the sub pin is inserted, and a bush formed such that sliding resistance between the sub pin and the pin hole differs in an advance direction and an escape direction of the sub pin is disposed in the groove.

In addition, Patent Document 2 discloses a configuration in which a bush having a convex section in an outer circumference thereof is provided on a tip of a sub pin. When the pin is moved with respect to the pin hole in the axial direction by an anti-pressing power of the piston during braking, a shearing force is generated in the bush interposed between the pin hole and the pin. When the bush with no convex section is used, since the stiffness thereof is high and the elastic deformation amount is small, the bush is slid with respect to the pin hole. If the bush is large and elastic deformation occurs when a shearing force is generated, while recovery of elastic deformation after braking release is also increased and cannot easily become a resistance of recovery to an original position of the pin with respect to the pin hole, it is possible to resist the recovery to the original position of the pin with respect to the pin hole, cause dragging of the pads and generate abnormal noises when the elastic deformation amount is small and the pads slide with respect to the pin.

In Patent Document 2, since a spring constant of a convex section provided on an outer circumference of the bush is low with respect to a base section, the convex section is deformed during braking, the pin can be easily moved in the axial direction as the convex section after braking release is recovered to a shape before braking, and occurrence of abnormal noises due to dragging can be minimized. However, in the bush in which the convex section is provided in the outer circumference, in relation to wear tracking of the pads, when braking is repeated and linings of the pads are worn, the convex section slides with respect to the inner circumferential surface of the pin hole, and the convex section having low stiffness is easily worn due to the sliding. As a result, when the interference is reduced due to wearing, a holding force of the pin by the bush is decreased, and abnormal noises due to rattling of the pads may occur.

On the other hand, in the disk brake 10 of the embodiment, the bush 131 having the plurality of convex sections 162 on the inner circumferential side is disposed on the small diameter section 146 formed on a tip side of the pin main body 130 of the slide pin 30. When the pin holes 29 and the pin main body 130 move to be relative to each other and a shearing force is generated in the bush 131 interposed therebetween, since the plurality of convex sections 162 on the inner circumferential side can be largely elastically deformed, recovery of the elastic deformation after braking release is increased, and cannot easily become a resistance of recovery to an original position of the pin main body 130 with respect to the pin hole 29. Accordingly, dragging of the pads 12 can be minimized and occurrence of abnormal noises can be minimized.

In addition, in the bush 131, the main body section 161 can come in contact with the inner circumferential surface 29a of the pin hole 29 other than the plurality of convex sections 162 because the plurality of convex sections 162 are provided on the inner circumferential side. Accordingly, in relation to wear tracking of the pads 12, when braking is repeated and the pads 12 are worn, the main body section 161 is slid with respect to the inner circumferential surface 29a of the pin hole 29, and the main body section 161 having high stiffness cannot be easily worn with respect to the sliding. Accordingly, a decrease in interference due to wearing can be minimized, and occurrence of abnormal noise due to rattling of the pads 12 can be minimized.

In addition, since the convex sections 162 are formed in a tapered shape, the elastic deformation amount of the main body section 161 in the axial direction can be secured and manufacturing thereof is facilitated.

In addition, since the bush 131 is formed of a resin, the elastic deformation amount of the main body section 161 in the axial direction can be secured and manufacturing thereof is facilitated.

Figure 8:
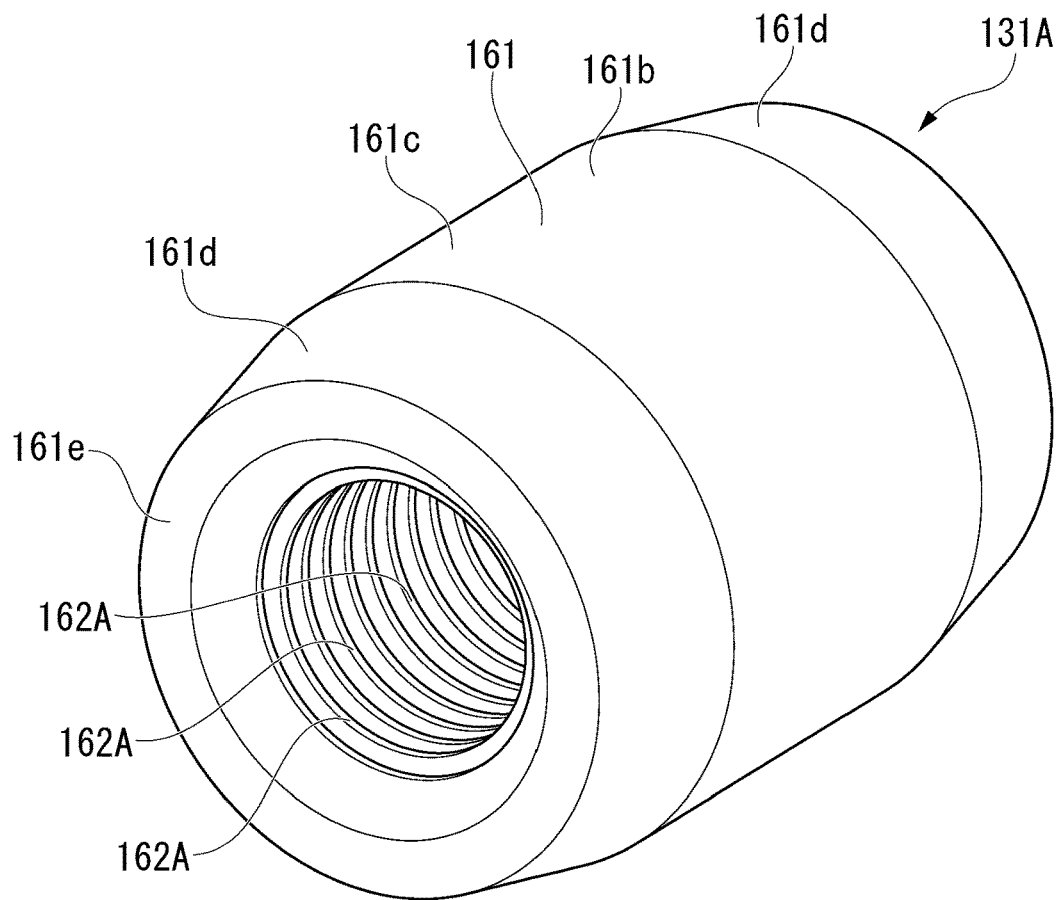
FIG. 8 is a perspective view showing a variant of the bush of the disk brake of the embodiment.
Figure 9:
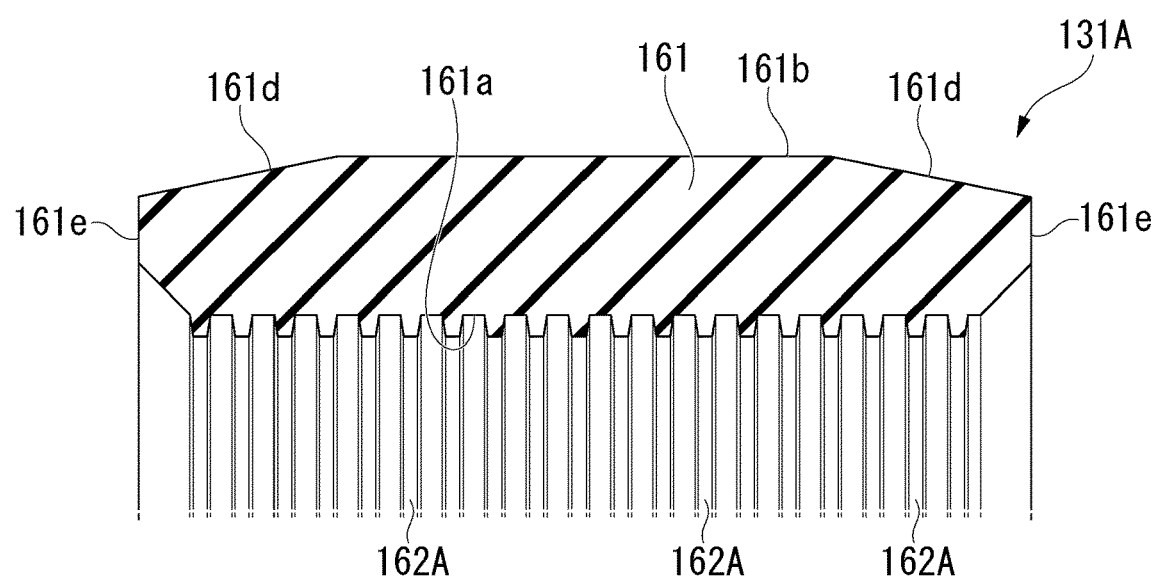
FIG. 9 is a cross-sectional view showing one side of a variant of the bush of the disk brake of the embodiment from a centerline thereof.

Further, instead of the bush 131, a bush 131A shown in FIGS. 8 and 9 can also be used. The bush 131A has a plurality of convex sections 162A protruding inward from an inner circumferential surface 161a of the main body section 161 in the radial direction of the inner circumferential surface 161a. Accordingly, the bush 131A also has the plurality of convex sections 162A on an inner circumferential side.

The plurality of convex sections 162A are formed in an annular shape along the inner circumferential surface 161a and disposed to be arranged in the axial direction of the main body section 161. Specifically, the plurality of convex sections 162A have all the same shape and the same size, are formed in an annular shape coaxially with the inner circumferential surface 161a, and are arranged at equal intervals in the axial direction of the main body section 161. The plurality of convex sections 162A have an isosceles trapezoidal cross section having a shape with an width of the main body section 161 in the axial direction that is reduced as it protrudes from the inner circumferential surface 161a of the main body section 161, in other words, a thickness of the main body section 161 in the axial direction that is reduced as it goes toward a tip side.

According to a first aspect of the embodiment, a disk brake includes an attachment member having a pair of pin support sections in which pin holes extending in a disk axial direction are formed and disposed to cross an outer circumferential side of a disk, and fixed to a non-rotating section of a vehicle; a caliper having a pair of slide pins slidably inserted into the pin holes at both sides in a disk circumferential direction and movably supported by the attachment member in the disk axial direction; and a pair of pads movably supported by the attachment member and pressed against both surfaces of the disk by the caliper, wherein, in the pair of slide pins, one slide pin includes: a pin main body having an annular groove on a tip side; and a tubular elastic deformation member having a plurality of convex sections on an inner circumferential side and provided in the annular groove. Accordingly, occurrence of abnormal noise can be minimized.

According to a second aspect of the embodiment, in the first aspect, an outer circumferential surface of the annular groove has a small diameter section having a diameter smaller than that of a base end side, and tips of the convex sections abut the small diameter section with interference.

According to a third aspect of the embodiment, in the first or second aspect, since each of the convex sections is a tapered shape, an elastic deformation amount can be secured, and manufacturing thereof is facilitated.

According to a fourth aspect of the embodiment, in any one of the first to third aspects, the convex section each is formed in a conoidal shape and are disposed in a lattice shape.

According to a fifth aspect of the embodiment, in any one of the first to third aspects, the convex sections are formed in an annular shape along an inner circumferential surface and disposed to be arranged in the axial direction.

INDUSTRIAL APPLICABILITY

According to the above-mentioned disk brake, occurrence of abnormal noises can be minimized.

REFERENCE SIGNS LIST

10 Disk brake
11 Attachment member
12 Pad
13 Caliper
20 Disk
26 Pin support section
29 Pin hole
30 Slide pin (slide pin on one side)
31 Slide pin
130 Pin main body
131, 131A Bush (elastic deformation member)
146a Outer circumferential surface (small diameter section)
153 Bush holding groove (annular groove)
162, 162A Convex section

What is claimed is:

1. A disk brake comprising:
an attachment member having a pair of pin support sections in which pin holes extending in a disk axial direction are formed and disposed to cross an outer circumferential side of a disk, and fixed to a non-rotating section of a vehicle;
a caliper having a pair of slide pins slidably inserted into the pin holes at both sides in a disk circumferential direction and movably supported by the attachment member in the disk axial direction; and
a pair of pads movably supported by the attachment member and pressed against both surfaces of the disk by the caliper,
wherein, in the pair of slide pins, one slide pin comprises:
a pin main body having an annular groove on a tip side; and
a tubular elastic deformation member having a plurality of convex sections on an inner circumferential side which are configured to be deflected in the disk axial direction when the slide pin moves in the disk axial direction and provided in the annular groove, and
wherein the convex sections are each formed in a conoidal shape and are disposed in a lattice shape.

2. The disk brake according to claim 1, wherein an outer circumferential surface of the annular groove has a small diameter section having a diameter smaller than that of a base end side, and tips of the convex sections abut the small diameter section with interference.

3. The disk brake according to claim 1, wherein each of the convex sections is a tapered shape.

4. The disk brake according to claim 1, wherein the convex sections are formed in an annular shape along an inner circumferential surface and disposed to be arranged in the axial direction.

* * * * *